Aug. 2, 1955  V. O. BOWLES  2,714,504
LIGHT WEIGHT FRACTIONATING TRAY
Filed Dec. 17, 1952  4 Sheets-Sheet 1
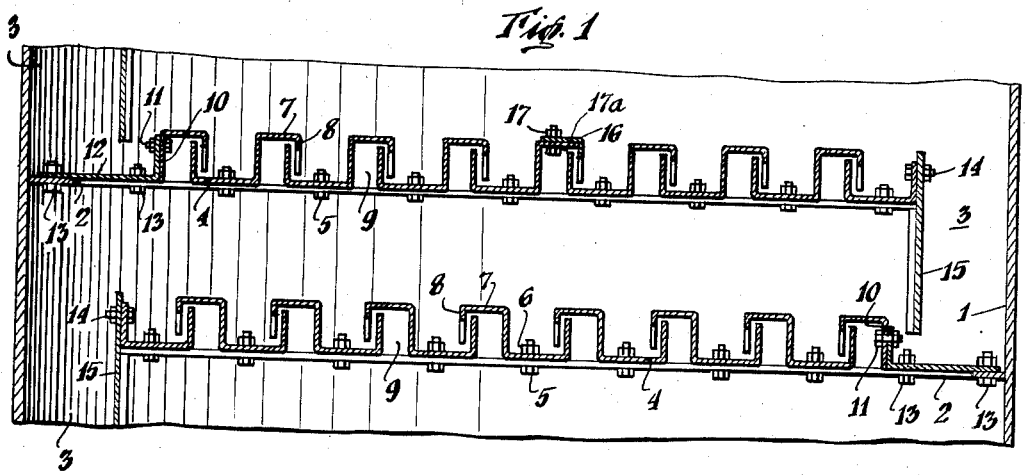
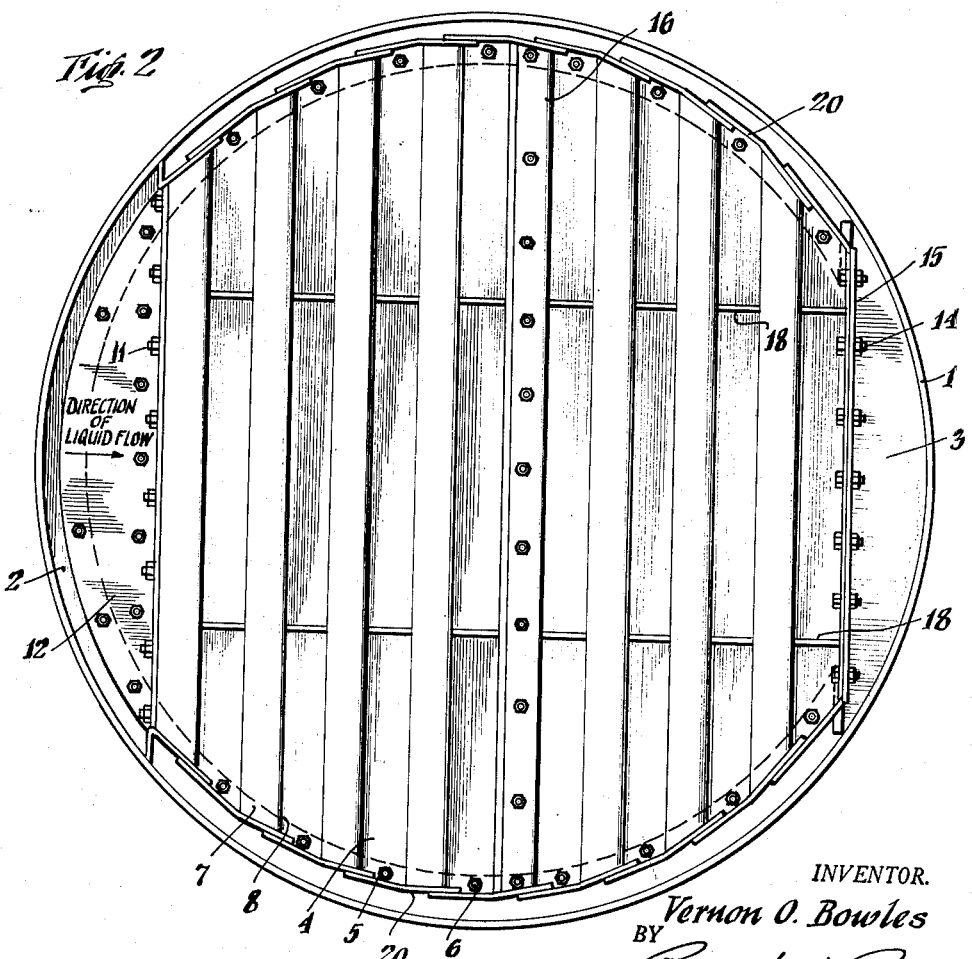
INVENTOR.
Vernon O. Bowles
BY Raymond W. Barclay
ATTORNEY

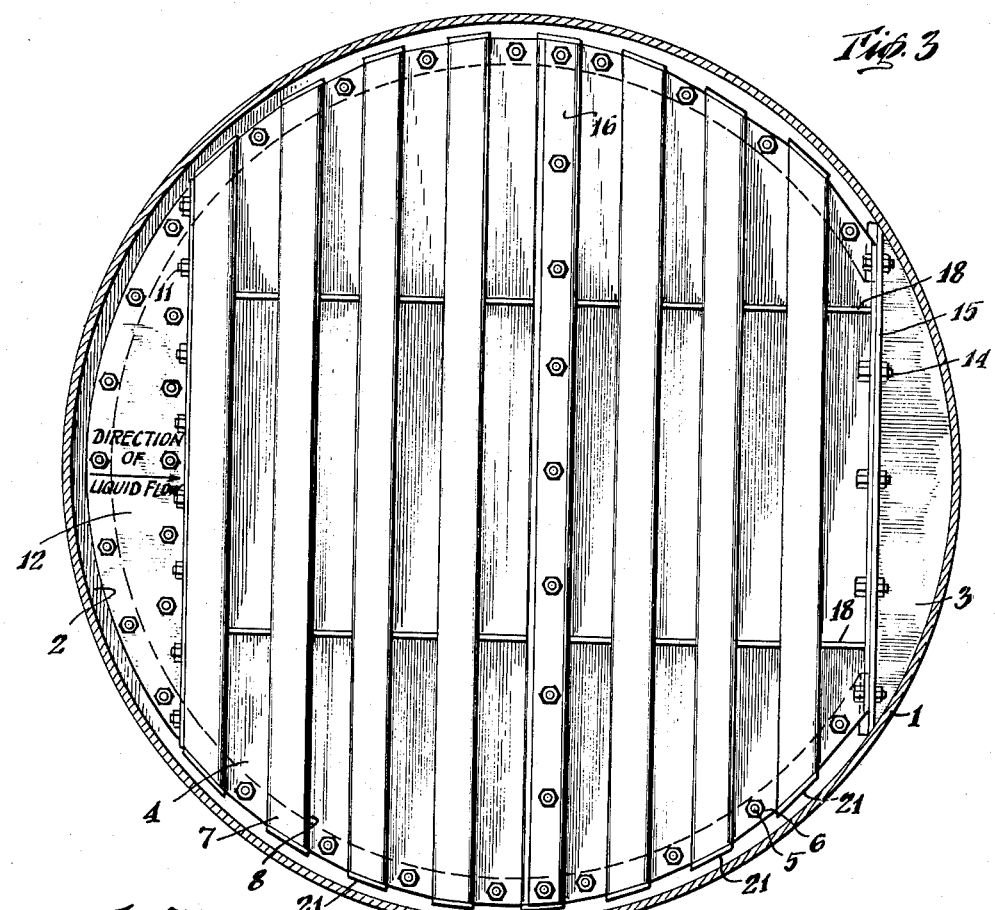
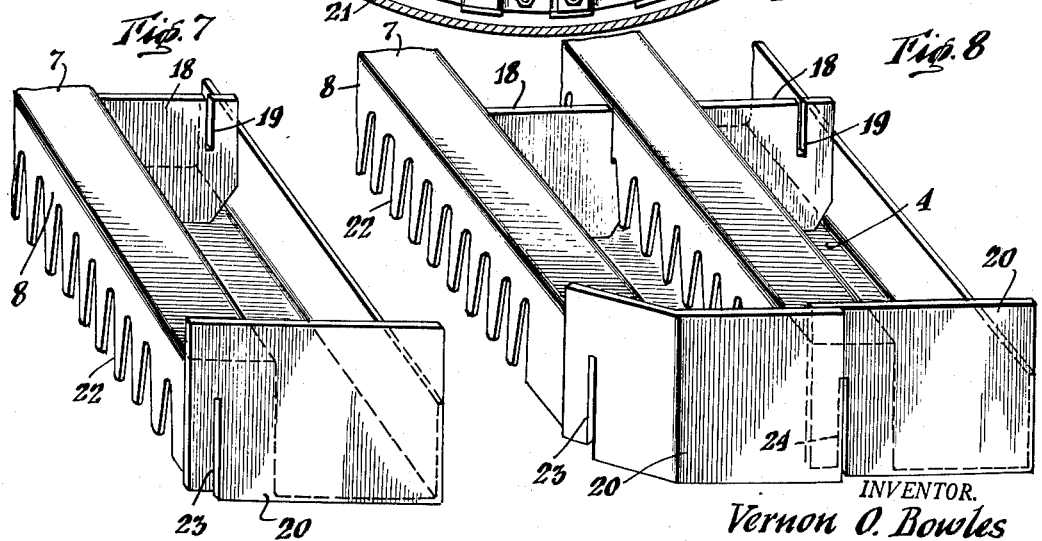

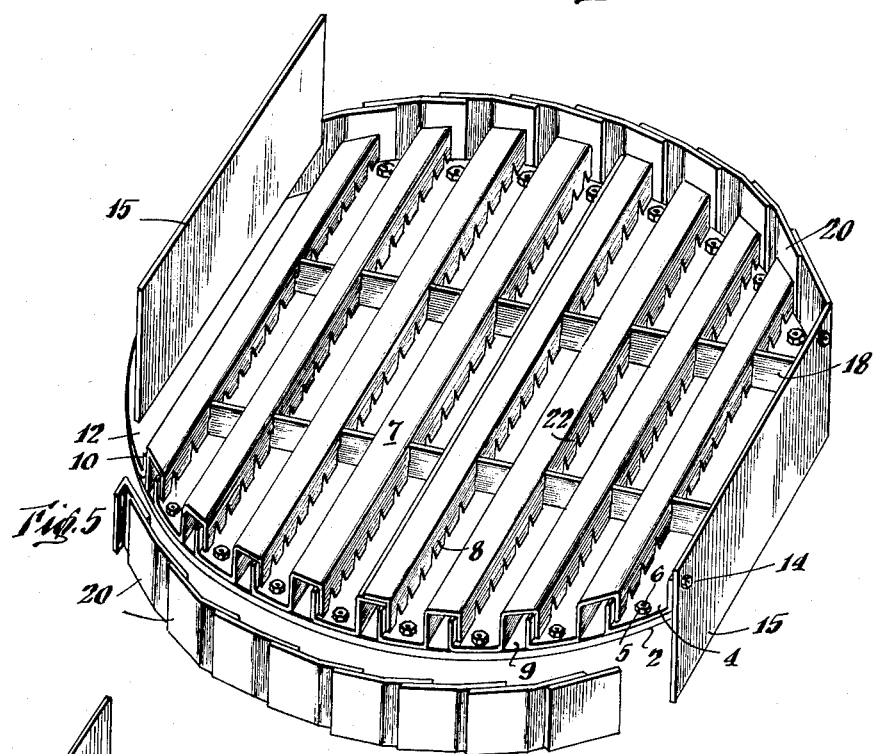
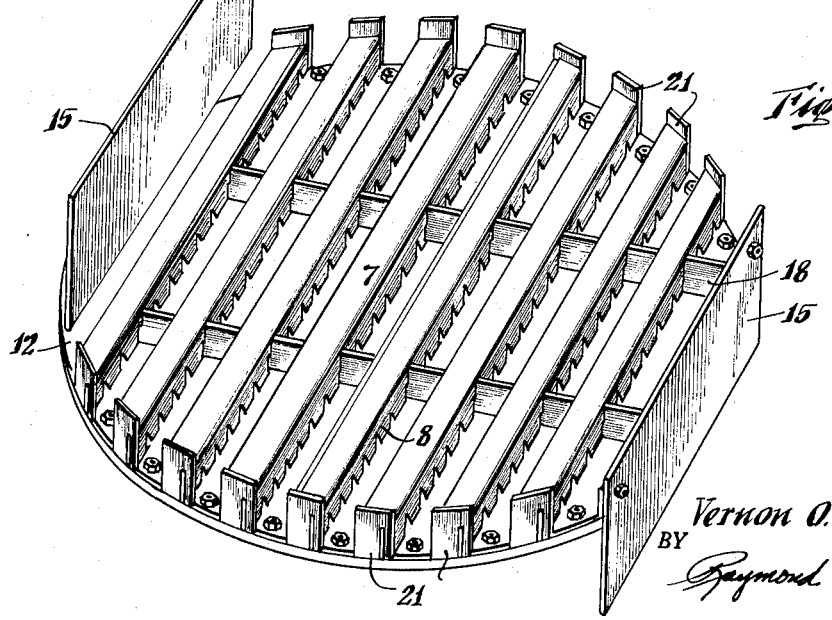

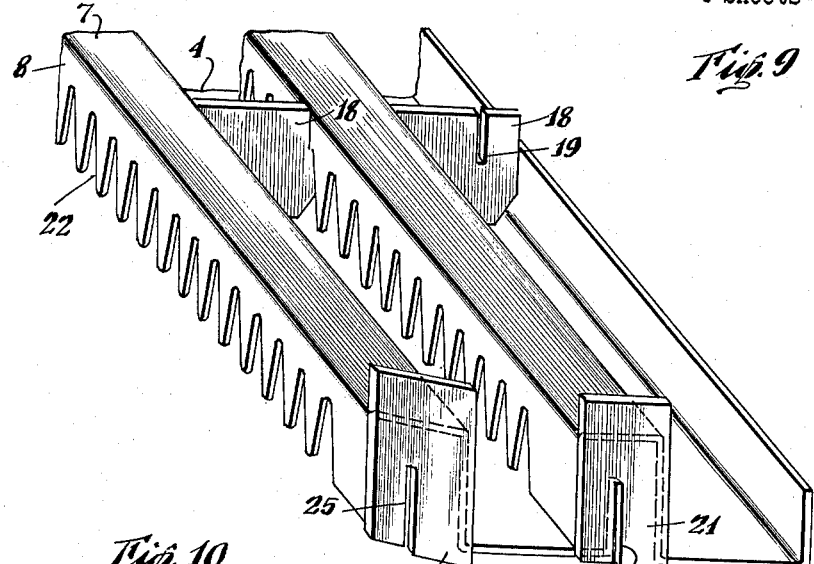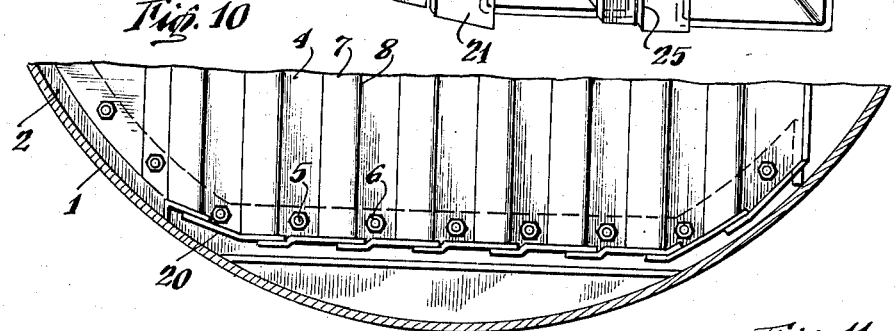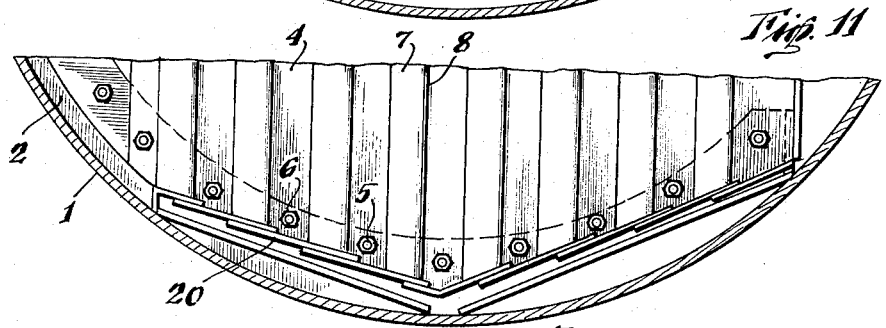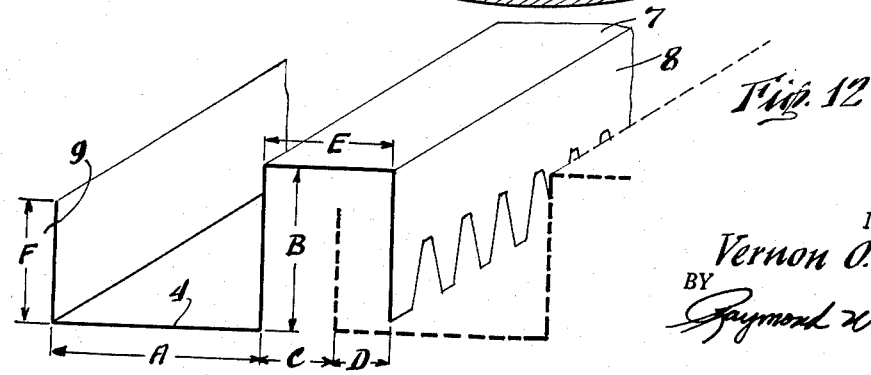

United States Patent Office 2,714,504
Patented Aug. 2, 1955

2,714,504

LIGHT WEIGHT FRACTIONATING TRAY

Vernon O. Bowles, Rye, N. Y., assignor to Socony Mobil Oil Company, Inc., a corporation of New York Application December 17, 1952, Serial No. 326,481

12 Claims. (Cl. 261—114)

The present invention relates to an improvement in fractionating towers and particularly to the trays used therein in which a gas passes through a liquid. This application is a continuation-in-part of my copending application Serial No. 186,860, filed September 26, 1950, now Patent 2,692,128 dated October 19, 1954.

Fractionating towers of the type conventionally employed in the refining industries for fractionating hydrocarbon liquids and the like have heretofore generally been constructed by mounting a plurality of rigid horizontal plates at various elevations within a cylindrical tank. These horizontal plates are ordinarily pierced by a plurality of orifices over which are placed bubble caps so that vapors rising in the tower pass up through the orifices and bubble down into the liquid on the plate. The downwardly flowing liquid passes from plate to plate by means of downcomers to afford contact between vapor and liquid at a number of various levels as determined by the relative position of the horizontal plates or bubble trays.

The trays of the bubble cap type of tower are usually constructed of metal and supported by annular flanges spaced along the outer edge of the trays and secured to the inside wall of the tank. To afford the necessary rigidity and strength, the trays must be constructed of relatively thick metal plate and must frequently have supporting beams to avoid deflection of the plate. As generally recognized, the maintenance, and particularly the cleaning, of bubble cap type trays is cumbersome. It is, for example, well known that, during fractionation of petroleum hydrocarbons, a gummy or carbonaceous deposition frequently takes place on the plates due to polymerization, coking, and the action of sulfur compounds and other agents. The cleaning of bubble cap plates made up of numerous bubble caps, risers, and associated fastenings in such instances is a tedious operation, accomplished only at the expenditure of considerable time and labor. Furthermore, while the trays are preferably constructed of a corrosion-resistant metal such as stainless steel, the cost of fabricating a tray of such material having sufficient thickness, together with supporting beams to provide the necessary rigidity and strength, has heretofore been an expensive proposition. Common practice has been to construct trays of less expensive material such as cast iron or steel. A tray fabricated from such metals affords the necessary thickness in construction at a comparatively reasonable cost but such trays are heavy and are unsatisfactory when liquid and vapors coming in contact therewith are of a corrosive nature. Corrosion of the trays necessitates frequent replacement or repair thereof which, as pointed out hereinabove, is not only an expensive proposition but a laborious and time-consuming operation due to the complexity of design and to the weight of the heavy metal parts used in fabrication. Thus, economics often dictate that the fractionating tray be constructed of corrosion-resistant alloy regardless of initial cost.

It is an object of the present invention to overcome the aforesaid disadvantages in fractionating tray construction and to provide a fractionating tower wherein a corrosion-resistant metal can be employed in relatively thin sections for fabrication of the tray.

A further object is the provision of a fractionating tray wherein the functional members making up said tray serve as light-weight structural beams extending transversely across the tank, thereby permitting the construction of a comparatively light tray which is easy to fabricate, assemble, and maintain in operation.

A still further object of this invention is to provide a fractionating tray of sections having inherent structural strength and simple design so that both the cost of fabrication in the shop and installation in the field is minimized and therefore to afford a tray which can be installed at less cost than other types of fractionating trays presently in use.

A very important object of this invention is the provision of a fractionating tray having interlocking functional and structural members afforded by the presence of slotted end plates affixed to either end of said members, and slotted stiffening webs affixed thereto at intermediate points.

A fractionating tray construction designed to fulfill the aforesaid objects is hereinafter described, together with other features of the invention.

The invention will be more readily understood by reference to the accompanying drawings wherein:

Figure 1 is an elevational view partly in section of a portion of a fractionating tower showing trays constructed in accordance with the invention.

Figure 2 is a plan view of a fractionating tray embodying one form of the invention.

Figure 3 is a plan view of a fractionating tray showing another form of the invention with partial end closure.

Figure 4 is an isometric view of a fractionating tray fabricated in accordance with the invention.

Figure 5 is an isometric view illustrating in detail the nature of the end plates.

Figure 6 is another isometric view showing a fractionating tray with partial end closures.

Figure 7 is an enlarged isometric view of an end plate having a section of the member affixed thereto.

Figure 8 is a detailed side isometric view showing the manner of interlocking of two adjacent members which make up the fractionating tray.

Figure 9 is a side isometric view similar to Figure 8 but showing interlocking of adjacent members by means of slotted partial end closures.

Figure 10 is a plan view of a portion of a fractionating tower similar to Figure 2 but illustrating an alternate end arrangement of the trays.

Figure 11 is a plan view of a portion of a fractionating tray similar to Figure 2, but illustrating another alternate end arrangement of the trays.

Figure 12 is an enlarged isometric view of the members which make up the fractionating tray.

Referring more particularly to the drawings, in which like reference characters denote like parts, 1 designates an elongated cylindrical tank which forms the shell of the fractionating tower. Since the tank may be of any desired height and diameter, only a portion thereof is shown. A plurality of trays is mounted at various elevations throughout the tank, the number of said trays depending upon the requirements of the fractionation to be performed. While only two trays have been shown in Figure 1, it will be understood that additional trays may be positioned above and below the particular set of trays illustrated. A plurality of support rings 2 is welded or otherwise secured to the inside wall of tank 1. Resting upon and affixed to each support ring are the members which make up the fractionating tray. Adjacent to each group of horizontal trays are downcomers 3, through which liquid passes. Each downcomer is sealed by the level of liquid on the tray below, thus preventing the upward passage of vapors therethrough.

The invention as set forth hereinabove is particularly directed to the construction, design, and mounting of the fractionating trays. The trays, as will be seen, are composed of a series of troughs 4 spaced at uniform intervals transversely across the tank and positioned in co-planar relationship one with the other. Each of the troughs is secured to the support ring 2 by suitable fastening means such as bolts 5 held in position by nuts 6. The vertical walls of each of the troughs are positioned at substantially right angles to the respective trough bottoms. However, said walls may vary from the vertical as much as 30° without effecting the functional property thereof, it being understood that the individual troughs in a given tray are preferably of the same design.

To each trough is attached an L-shaped section composed of a horizontal leg 7 attached to the downstream edge of the trough and a vertical leg 8, the lower edge of which is serrated. The aforementioned L-shaped section overhangs into the next succeeding trough, thereby providing a passage 9 between each pair of adjacent troughs. The L-shaped section overhanging the upstream trough of each tray is attached to a vertical plate 10 which, in turn, is affixed by suitable fastening means, such as bolts 11 to angle support plate 12, the horizontal extension of the latter being contiguous with and affixed to support ring 2 by bolts 13. The downstream wall of the trough terminating each tray section is affixed by bolts 14 to plate 15 which extends vertically below the horizontal level of said trough to a point sufficient to effect an adequate vapor seal. This may be accomplished by extending plate 15 downwardly to a point sufficiently above plate 12 of the next lower tray so that liquid can easily flow thereunder but sufficiently below the top of vertical plate 10 of said lower tray to provide a vapor seal. When the liquid flow is very large, plate 10 is desirably vertically extended to provide an adequate vapor seal. Access between trays for maintenance or repair can be obtained by simply removing a few tray sections. For such purpose, it is desirable to facilitate vertical entry through the tray sections by providing alternate trays with a removable L-shaped section 16 which is fastened by bolt 17 or other suitable means to plate 17a. Access into the tray section, when desired, can then be gained by effecting removal of section 16 and the remaining downstream troughs making up the tray. An appropriate number of the upstream troughs of the next lower tray can then easily be removed and likewise alternate groups of downstream and upstream troughs of succeeding levels of trays may be removed until the desired point of entry is attained.

The downcomers are staggered on alternate trays in such manner as to cause a back-and-forth travel of liquid in a horizontal direction across each successive tray in addition to the vertical flow from tray to tray. The horizontal flow of liquid across each tray is caused by vapor impact compensating for the hydraulic gradient between the point where liquid enters the tray and the point where it leaves the tray. Thus, the vapors being contacted issue in the same direction as liquid flow across the tray and the impinging action of the vapors serves to move the liquid across of the tray and thereby compensate for the hydraulic gradient. The vertical plate 10 of each tray is affixed through support plate 12 to support ring 2 in such manner that it is substantially perpendicular to the flow of liquid proceeding across each tray after the same has entered the tray through downcomer 3. Likewise, since the vertical walls of each of the troughs 4 and the overhanging vertical legs 8 of each of the L-shaped sections are parallel to vertical plate 10, these members are also located perpendicular to the horizontal flow of liquid across the tray. The result of this perpendicular arrangement of troughs and overhanging L-shaped sections to the line of liquid flow is a rippling effect as the liquid travels across each tray and passes downwardly through the tank. The combination of the rippling effect of the liquid and the bubbling action of the vapors passing therethrough thus affords an intimate degree of contact between vapor and liquid and compensates for the hydraulic gradient required to effect horizontal liquid flow.

Referring to the plan view of the fractionating tray shown in Figure 2, it will be seen the that the troughs 4 and overhanging L-shaped sections made up of legs 7 and 8 extend transversely across tank 1 and are suitably stiffened by one or more webs 18. These plate-like metal strips extend across the trough section of the tray in a right angle direction to the troughs and serve to stiffen the vertical walls of the trough section against deflection, particularly in the central portion of the tray. Any desired number of stiffening webs may be employed, generally positioned on approximately 12 to 30-inch centers. The webs are slotted so that the serrated edge of overhanging vertical leg 8 interfits into the slot provided and thereby serves to impart structural strength to the fractionating tray. The slot in web 18 is shown particularly in Figures 7, 8, and 9, and is denoted as 19. While the aforementioned stiffening webs are not generally necessary in trays of small diameter, they have been found to greatly improve the overall structural strength of the trays and their use is therefore preferred.

The troughs and overhanging L-shaped sections making up the trays are fitted with end closure plates 20 as particularly shown in Figures 2, 5, 7, and 8. Alternatively, in a simplified modification, a partial end closure is effected by plates 21 of the area encompassed by the overhanging L-shaped sections and the vertical trough walls to which said sections are attached as particularly shown in Figures 3, 6, and 9, the ends of the troughs in such embodiment remaining open. When plates 20 are employed, the same overlap one another as shown and are welded or otherwise perpendicularly affixed to the trough and L-shaped sections, providing a suitably tight end closure therefor. Partial end closure plates 21, when employed, are likewise perpendicularly affixed by welding or other suitable means to the L-shaped sections and the vertical trough walls to which said sections are attached to provide a tight end closure of such area. The end plates in every instance are slotted and rest on support ring 2. The small clearance between the shell of tank 1 and the end closure plates may, if desired, be filled with packing, although the use of packing is not considered essential.

An isometric view of the fractionating tray of the type described herein is illustrated by Figure 4. The vertical leg 8 of the overhanging L-shaped section is serrated with the serrations 22 pointing downward and extending into the adjacent downstream trough to provide an effective bubbling means for passing vapor through liquid flowing perpendicularly across the trough. It will further be noted that slotted stiffening webs 18 interfit into and engage the serrated edges of the overhanging sections. During operation, vapors from the tray below pass up through passage 9 between two adjacent troughs, over the upstream edge of the downstream trough, and then through the serrated edge of leg 8 where vapor bubbles are released into the liquid on this trough.

The arrangement of end closure plates 20 is further illustrated in detail by the isometric views of Figures 5, 7, and 8. Each end plate is provided with a slot 23 which interfits over the vertical edge of the upstream wall of the adjacent downstream trough. This arrangement is shown in Figure 8 for one of the troughs, the recessed slot therein being designated by numeral 24 and extending vertically from the lower edge of the end plate at a point corresponding to the juncture of the upstream wall of the adjacent downstream trough and the end closure plate affixed to said adjacent trough. The end arrangement of the closure plates may be substantially circular, as shown in Figure 2, or may alternatively be arranged in the form of a polygon, as shown by Figures 10 and 11. As will be noted, the closure plates may either be straight or bent to conform to the shape of the tank.

The arrangement of partial end closure plates 21 is further shown in detail by the isometric views of Figures 6 and 9. Each of the plates 21 is provided with a slot 25 which interfits over and engages the vertical edge of the upstream wall of the adjacent downstream trough. The trough portion between vertical leg 8 of the L-shaped section and the vertical wall of the adjacent downstream trough is open at either end in such embodiment, resulting in a further saving of metal while providing a light structurally rigid tray. The end arrangement of plates 21 may also be substantially circular, as shown in Figure 3, or alternatively may be arranged in the form of a polygon.

The width of the troughs 4 is directly related to the slot area; that is, the area of all of the slots in a given tray. Preferred design employs slot area equal to about 8 to about 17 per cent of the total tower cross-section. However, the widths of the troughs making up the instant trays may be so established as to attain slot areas ranging from about 5 to about 20 per cent of the total tower cross-section. A related advantage of the present tray construction is the high percentage of riser area attained; that is, the cross-sectional area between the troughs 4 through which the vapors pass upwardly. Existing bubble cap trays achieve riser areas ranging from 6 to 15 per cent whereas the instantly described tray achieves a riser area of 25 to 30 per cent or greater. Moreover, the tray construction of the invention has an equally high reversal area and vapor downflow area corresponding to the annular area in existing bubble cap tray design. These large areas which the trays of this invention thus afford result in low pressure drop of vapor flow through the tray which is particularly advantageous in vacuum fractionation. The aforesaid areas are directly related to the dimensions of the tray sections. The larger the sections, the simpler is the design thereof and the less the weight. However, larger sections give rise to smaller slot area, riser area, reversal area, and vapor downflow area, the latter being equivalent to annular area in conventional bubble cap design. With reference to Figure 12, the broad and preferred dimensions of the present tray sections are set forth below:

| Dimension | Broad Range (inches) | Preferred Range (inches) |
|---|---|---|
| A | 2 to 8 | 3 to 5. |
| B | 1 to 6 | 2 to 4. |
| C | ½ to 3 | 1 to 2. |
| D | ½ to 2 | about 1. |
| E | 2 to 5 | 2 to 3. |
| F | 1 to 5 | 1½ to 3. |

The above-indicated preferred range offers the optimum design as regards simplicity, strength, and performance.

Construction and mounting of fractionating trays in accordance with this invention has proved advantageous in that each of the members making up the tray serves as a structural beam extending transversely across the tank so that it thereby becomes possible to construct the trays of a light corrosive-resistant metal at lower cost than other constructions employing heavier metal. The cross-section of the troughs making up the present trays gives an inertia moment such that the thickness of the metal plate used in tray construction may be reduced up to 50 per cent as compared with conventional bubble type trays. Independently from reduction in thickness, the weight of the present tray is less than that of a conventional tray as it has no chimney, caps, cap risers or beams. Thus, a tray of the present invention constructed for a 13′ diameter fractionating tower required about 1320 pounds of steel whereas a conventional tray with chimneys and caps of the same diameter required about 2200 pounds of steel, representing an increase in steel consumption of approximately 67 per cent. The described arrangement of a series of troughs and overhanging L-shaped sections forming a bubbling device which in itself is a structural member of the tray, together with interlocking end closure plates, is further advantageous from an operating point of view. For example, it has been found that, with the fractionating tray construction of this invention, a tray can be designed for not more than ⅛-inch deflection in a 9-foot span, using 16-gage stainless steel and that said tray weighs less than 10 pounds per square foot. This advantage, resulting in reduced tray weight, contributes to reducing its initial cost to as much as 50 per cent of that of other alloy fractionating trays currently being employed. The fractionating tray herein described, composed of a number of sections which vary in dimension only lengthwise, can be made from one set of dies. The co-planar arrangement of trough sections in accordance with the instant invention results in simplified installation and fabrication. Thus, a minimum of initial fabrication work is required because of standardization. Moreover, as a result of the simplicity of the design, considerably less installation and maintenance labor is required. Each section is capable of being fabricated, installed, and supported individually and has structural properties independent of the other sections of such magnitude as to require no support beams except in very large diameter fractionators. There is, in addition, a considerable saving in bolting with the present trays since the bolts ordinarily required in conventional trays to fix caps on chimneys and to fix different elements between them may be eliminated. Also, the provision of tray manways necessary in conventional bubble trays are not required in the present trays since access between decks for maintenance or repair can easily be gained by simply removing a few sections of the interlocking troughs. Also, in conventional bubble trays, certain sections of the slotted portion of the caps are proximate to other slotted portions and there is undesirable interference with a resultant degree of inefficiency. In the present tray design, there can be no such interference since each row of slots or serrations is isolated from the others.

Thus, the design of the present fractionating tray has many mechanical advantages and at the same time brings about equal slot submergence because of the action of the vapors on the liquid travelling across the tray. The vapor stream being contacted issues in the same direction as liquid flow across the tray and the action of the vapors serves to move the liquid across each tray and thereby compensate for the hydraulic gradient.

While there has been described various preferred embodiments of the present invention, it will be understood that the invention is not limited in scope to the specific details of construction illustrated and described but that the same is subject to considerable variation without departing from the underlying features of the invention as expressed in the claims set forth below.

I claim:

1. A lightweight tray for use in a fractionating tower, comprising a plurality of trough-like members which serve as structural beams extending transversely across the tower and a plurality of slotted elements affixed to either end of said members, adjacent members being interlocked one into the other by engagement of the slot edges of said elements affixed to either end of each member with the trough edge of an adjoining member.

2. In a fractionating tower comprising an elongated tank, a plurality of support rings affixed to the inner periphery of said tank and a plurality of elements for effecting fractionation supported on said rings at various levels within said tank, the improvement wherein said elements comprise a series of interlocking troughs extending transversely across said tank in a direction substantially perpendicular to the line of liquid flow, each of the troughs making up said series having plates affixed to and enclosing either end thereof, which plates are slotted in such manner as to interfit over the vertical edge of the adjacent trough, thereby providing interlocking assembly of the troughs and tight end closure therefor.

3. A lightweight tray for use in a fractionating tower, comprising a plurality of trough-like members which serve as structural beams extending transversely across the tower, a plurality of slotted elements affixed to either end of said members, and a plurality of stiffening webs, adjacent members being interlocked one into the other by engagement of the slot edges of said elements affixed to either end of each member with the trough edge of an adjoining member, said member further being strengthened against deflection by said stiffening webs which extend at predetermined intervals perpendicularly across the trough portion thereof.

4. In a fractionating tower comprising an elongated tank, a plurality of support rings affixed to the inner periphery of said tank and a plurality of elements for effecting fractionation supported on said rings at various levels within said tank, the improvement wherein said elements comprise a series of interlocking troughs extending transversely across said tank in a direction substantially perpendicular to the line of liquid flow, each of the troughs making up said series having at least one stiffening web extending across the trough in a right angle direction thereto and plates affixed to and enclosing either end of said trough, which plates are slotted in such a manner as to interfit over the vertical edge of the adjacent trough, thereby providing interlocking assembly of the troughs and tight end closure therefor.

5. A lightweight tray for use in a fractionating tower, comprising a plurality of troughs spaced at uniform intervals transversely across the tower and arranged in coplanar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of end closure plates affixed to either end of the troughs and overhanging sections, each of said plates being slotted and the slots therein engaging the vertical wall of the next adjoining trough, a plurality of stiffening webs extending across the troughs in a right angle direction thereto, said stiffening webs being slotted and the slots therein engaging the serrated edges of said overhanging vertical legs to afford a resulting rigid combination of interlocking troughs.

6. A lightweight tray for use in a fractionating tower, comprising a plurality of troughs spaced at uniform intervals transversely across the tower and arranged in coplanar relationship one with the other, a plurality of L-shaped sections having the horizontal legs thereof attached to one edge of each of the aforementioned troughs, the vertical legs of said sections being serrated and pointing downward and overhanging into adjacent troughs, thereby affording passages for the flow of vapor therethrough, a plurality of end closure plates affixed to either end of the overhanging sections and the vertical trough walls to which said sections are attached, each of said plates being slotted and the slots therein engaging the vertical wall of the next adjoining trough, a plurality of stiffening webs extending across the troughs in a right angle direction thereto, said stiffening webs being slotted and the slots therein engaging the serrated edges of said overhanging vertical legs to afford a resulting rigid combination of interlocking troughs.

7. A fractionating tower comprising an elongated tank, a plurality of support rings affixed at various elevations to the inner periphery of said tank, a plurality of troughs arranged in coplanar relationship upon said support rings and extending transversely across the tank, a plurality of end closure plates, one of which is affixed to either end of said troughs, said end plates being slotted and the slots therein engaging the vertical walls of adjacent troughs to rigidly hold said troughs in interlocking arrangement on said support rings perpendicular to the line of liquid flow across said tank, a plurality of L-shaped sections having the horizontal legs thereof attached to one edge of each of said troughs, the vertical leg of said section pointing downward, being serrated and overhanging into the adjacent trough to thereby afford passages for upward vapor flow through said tank.

8. A fractionating tray weighing less than 10 pounds per square foot and having a deflection of not more than ⅛ inch in a 9-foot span comprising a plurality of troughs positioned in coplanar relationship substantially perpendicular to the line of liquid flow, a plurality of slotted plates, and a plurality of stiffening webs, the ends of each of said troughs being enclosed by said plates, which plates have slots therein designed to interfit over the vertical walls of adjoining troughs, said walls in turn being further strengthened against deflection by said stiffening webs which extend across the troughs in a right angle direction thereto to afford a resulting rigid tray composed of stiffened interlocking troughs.

9. In combination with a tower, a fractionating tray comprising a plurality of troughs spaced at uniform intervals transversely across the tower and arranged in coplanar relationship one with the other, a plurality of L-shaped sections having the horizontal legs thereof attached to the downstream edges of each of the aforementioned troughs, the vertical legs of said sections being serrated and pointing downward and overhanging into adjacent troughs, thereby affording passages for the flow of vapor therethrough, a plurality of end closure plates perpendicularly affixed to either end of the troughs and overhanging sections, each of said end closure plates overlapping one another, and having a recessed slot extending vertically from the lower edge thereof at a point corresponding to the juncture of the upstream wall of the adjacent downstream trough and the end closure plate affixed to said adjacent trough, the slotted edge in each of said plates engaging the upstream wall of the adjacent downstream trough, to provide interlocking assembly of the troughs with attached overhanging sections and tight end closure therefor.

10. In combination with a tower, a fractionating tray comprising a plurality of troughs spaced at uniform intervals transversely across the tower and arranged in coplanar relationship one with the other, a plurality of L-shaped sections having the horizontal legs thereof attached to the downstream edges of each of the aforementioned troughs, the vertical legs of said sections being serrated and pointing downward and overhanging into adjacent troughs, thereby affording passages for the flow of vapor therethrough, a plurality of end closure plates affixed to either end of the overhanging sections and the vertical trough walls to which said sections are attached, each of said plates being slotted and the slots therein engaging the vertical wall of the next adjoining trough to thereby provide interlocking assembly of said troughs with attached overhanging sections and tight end closure therefor.

11. In combination with a tower, a fractionating tray comprising a plurality of troughs spaced at uniform intervals transversely across the tower and arranged in coplanar relationship one with the other, a plurality of L-shaped sections having the horizontal legs thereof attached to the downstream edges of each of the aforementioned troughs, the vertical legs of said sections being serrated and pointing downward and overhanging into adjacent troughs, thereby affording passages for the upward flow of vapor therethrough, a plurality of end closure plates perpendicularly affixed to either end of the troughs and overhanging sections, a plurality of stiffening webs extending across the troughs in a right angle direction thereto, each of said end closure plates overlapping one another and having a recessed slot extending vertically from the lower edge thereof at a point corresponding to the juncture of the upstream wall of the adjacent downstream trough and the end closure plate affixed to said adjacent trough, the slotted edge in each of said plates engaging the upstream wall of the adjacent downstream trough, said stiffening webs being slotted and the slots therein engaging the serrated edges of said overhanding vertical legs to afford a rigid combination of stiffened interlocking troughs.

12. In combination with a tower, a fractionating tray comprising a plurality of troughs spaced at uniform intervals transversely across the tower and arranged in coplanar relationship one with the other, a plurality of L-shaped sections having the horizontal legs thereof attached to the downstream edges of each of the aforementioned troughs, the vertical legs of said sections being serrated and pointing downward and overhanging into adjacent troughs, thereby affording passages for the upward flow of vapor therethrough, a plurality of end closure plates affixed to either end of the overhanging sections and the vertical trough walls to which said sections are attached, a plurality of stiffening webs extending across the troughs in a right angle direction thereto, each of said end closure plates being slotted and the slots therein engaging the vertical wall of the next adjoining trough, said stiffening webs being slotted and the slots therein engaging the serrated edges of said overhanging vertical legs to afford a rigid combination of stiffened interlocking troughs.

References Cited in the file of this patent

UNITED STATES PATENTS

| | | |
|---|---|---|
| 1,623,079 | Zimmerman | Apr. 4, 1927 |
| 1,822,323 | Stover | Sept. 8, 1931 |
| 2,400,623 | Band et al. | May 21, 1946 |
| 2,582,826 | Glitsch | Jan. 15, 1952 |

FOREIGN PATENTS

| | | |
|---|---|---|
| 839,695 | France | Apr. 7, 1939 |